Figure 1:
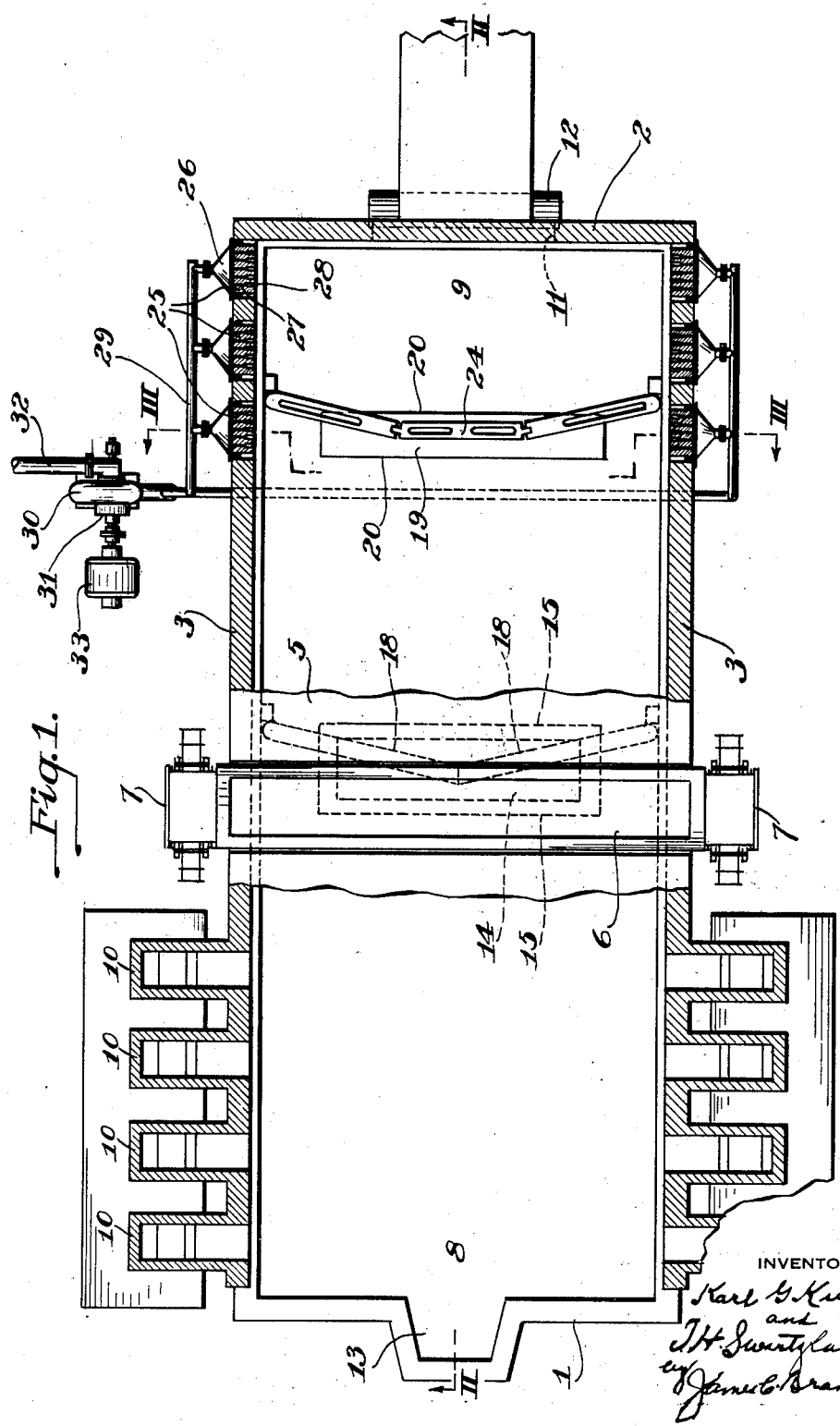

March 6, 1928. 1,661,836

K. G. KUTCHKA ET AL

GLASS MELTING TANK

Filed March 18, 1926. 4 Sheets-Sheet 1

INVENTORS.
Karl G. Kutchka
and
J. H. Swartzlander
by James C. Bradley
atty.

March 6, 1928.  1,661,836

K. G. KUTCHKA ET AL

GLASS MELTING TANK

Filed March 18, 1926  4 Sheets-Sheet 3

INVENTORS
Karl G. Kutchka
and
Thos. H. Swartzlander
by James C. Bradley

March 6, 1928. 1,661,836

K. G. KUTCHKA ET AL

GLASS MELTING TANK

Filed March 18, 1926 4 Sheets-Sheet 4

INVENTORS
Karl G. Kutchka
and
Thos. H. Swartzlander
by James C. Bradley

Patented Mar. 6, 1928.

1,661,836

UNITED STATES PATENT OFFICE.

KARL G. KUTCHKA, OF WILKINSBURG, AND THOMAS H. SWARTZLANDER, OF ASPINWALL, PENNSYLVANIA, ASSIGNORS TO PITTSBURGH PLATE GLASS COMPANY, A CORPORATION OF PENNSYLVANIA.

GLASS-MELTING TANK.

Application filed March 18, 1926. Serial No. 95,627.

The invention relates to glass melting tanks, such as those used in bottle work, in the making of glass cylinders, in the continuous rolling of rough plate glass, or for other purposes involving the melting and fining of large quantities of glass. The particular tank illustrated shows an outlet at the forward end with a pair of rolls for continuously rolling a sheet of glass, but the invention has a large degree of utility in tanks employed for other purposes as above indicated. In a tank of the type illustrated in which the batch is supplied at one end and the finished glass withdrawn at the other end, there is a tendency of the molten glass to flow through the center of the tank leaving the glass at the sides more or less stagnant, this being due to the fact that the glass is hotter at the center of the tank than at the sides, and hence more fluid and to the fact that the frictional resistance is greater along the sides of the tank than at the center. The lower temperature of the glass at the sides of the tank is in turn due to the cooling effect of the tank side walls, which are often artificially cooled to lengthen the life of the blocks.

As a result of this relatively restricted flow of glass down the center of the tank, portions of the melted batch pass from the filling end of the tank to the outlet end in a much shorter period of time than would be the case if there were a forward movement through the tank of a stream of glass having a greater cross section. The glass, therefore, falls short of the more thorough melting and fining, which is required in order to give a high quality of glass. The capacity of the tank is correspondingly reduced, as any forcing in the matter of production correspondingly reduces the period which the glass is given to pass from the filling end to the outlet, and increases the danger of producing glass of poor quality, incident to the presence of stone, ream and other defects resulting from a too rapid melting and fining.

Figure 2:
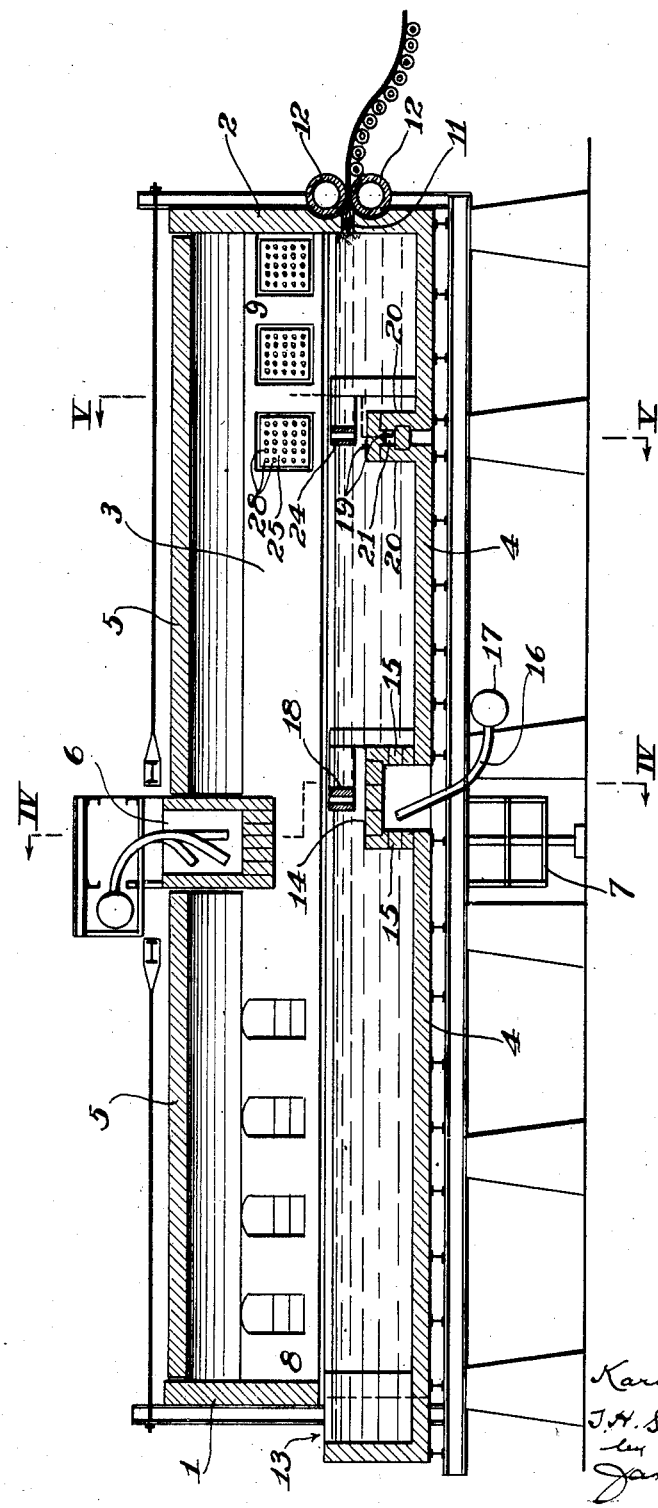
Figure 3:
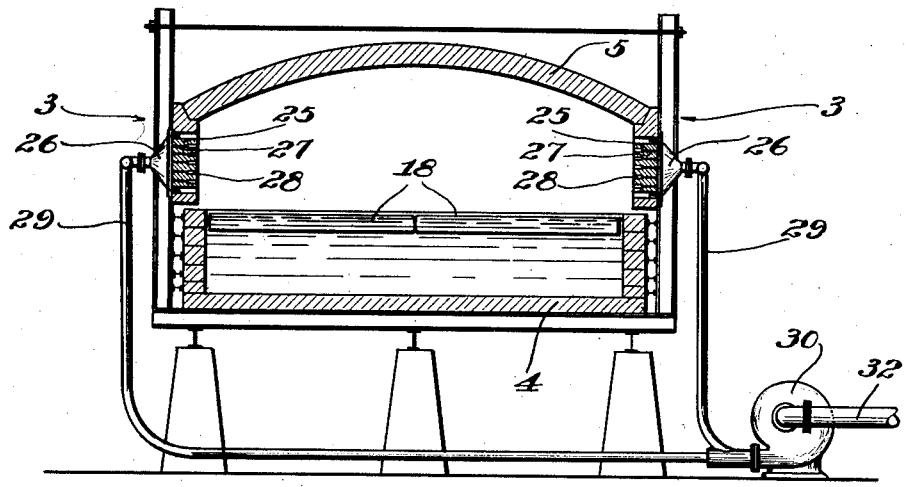
Figure 4:
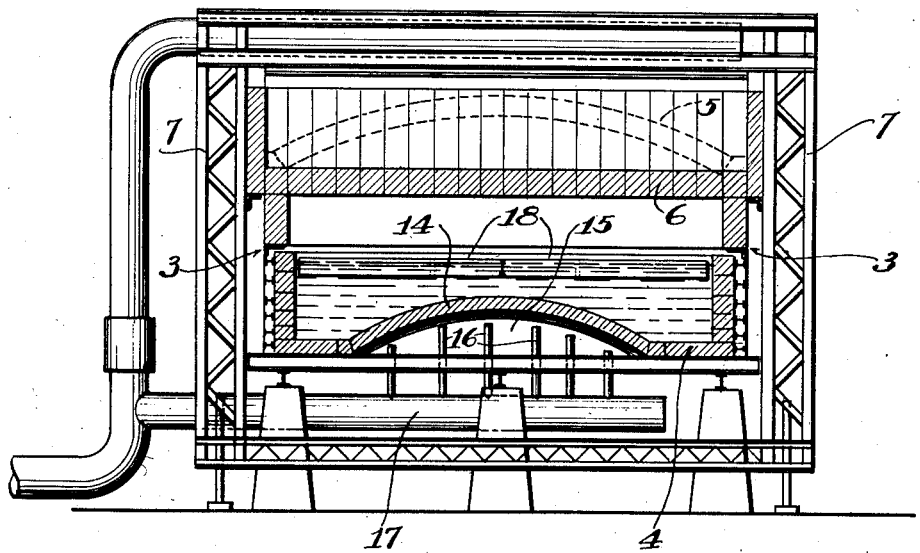
Figure 5:
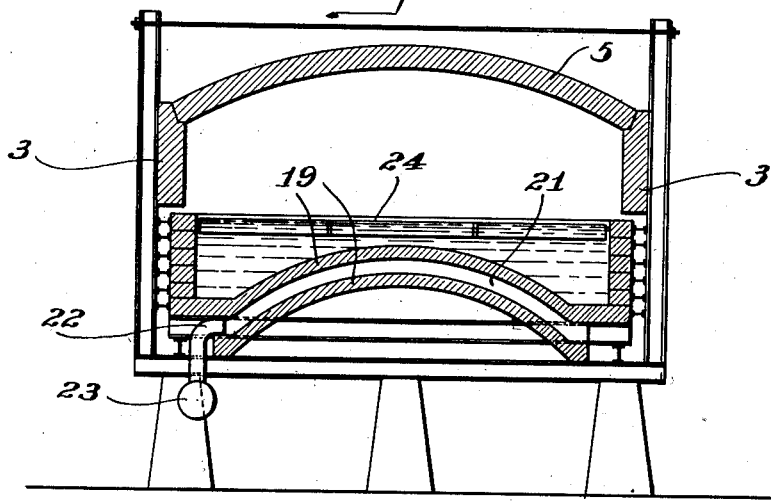
Figure 6:
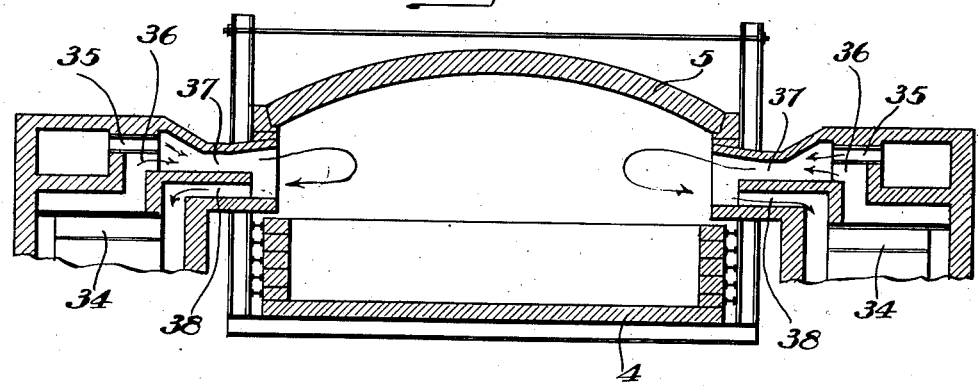
Figure 7:
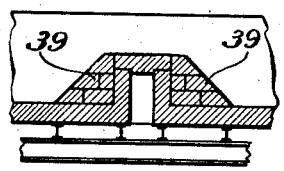

The object of the present invention is to provide a tank construction in which the flow of the body or stream of glass is widened and increased in cross section, so that the velocity of flow is reduced and gives a longer period of melting and fining, and in which the temperature of the glass in the working end of the tank along the side walls is increased to provide a greater flow in such portions of the tank incident to the greater fluidity of the glass at such points. Certain embodiments of the invention are illustrated in the accompanying drawings, wherein:

Figure 1 is a horizontal section through the tank. Fig. 2 is a vertical section on the line II—II of Fig. 1. Fig. 3 is a transverse section on the line III—III of Fig. 1. Fig. 4 is a transverse section on the line IV—IV of Fig. 2. Fig. 5 is a transverse section on the line V—V of Fig. 2. Fig. 6 is a transverse section through a modification, such section being taken at a point corresponding to the section of Fig. 3. And Fig. 7 is a section through a modified detail of construction.

Referring to the drawings, 1, 2, 3, 3, and 4 are the rear, front, side, and bottom walls respectively of a melting tank, and 5 is the arched top wall thereof. Intermediate the ends of the tank is an arch member 6 mounted in a framework 7 for vertical movement in accordance with the disclosure of the application of Karl G. Kutchka, Serial No. 74,557, filed December 10, 1925. This arch separates the tank into two parts, the rear part 8 being termed "the melting or filling end" and the front part 9 being termed "the working end". This arch member is designed to assist in maintaining a difference in temperature in the tank between the two ends, which difference in temperature may be regulated by vertically adjusting the position of the member.

The melting end of the tank is provided with the usual regenerator heating means, the flues of which only are shown in the drawings, being marked 10, 10, 10, 10. The forward or working end of the tank or furnace is provided with the outlet slot 11 (Fig. 2) in front of which are mounted the sizing rolls 12, 12 for continuously rolling out of a sheet of glass, which is subsequently annealed and cut in sections preliminary to grinding and polishing. These rolls are shown without supporting or driving means, and it will be understood that any suitable means are employed for this purpose as is well known in the art and that suitable means are provided for water cooling the rolls. As heretofore indicated, the particular means of utilizing the glass which is withdrawn has nothing to do with the present invention, as the glass may be withdrawn for any desired purpose, such as the manufacture of receptacles or the making of window glass, in which latter case the glass may be ladled from the tank or drawn directly from forehearths or extensions in a manner well known in the art. The feeding of the batch into the tank at its filling end 8 may be accomplished in any desired manner, an extension 13 being illustrated for this purpose, into which the batch is shoveled or dumped by means of a conveyor. Intermediate the ends of the tank, and preferably almost opposite to the arch member 6 is an arched bridge wall extending upward from the bottom of the tank and comprising the arch wall 14 and the two side walls 15, 15. This wall is preferably built of the same refractory material as the tank and may be cooled by means of a number of pipes 16 connected to a suitable air supply line 17 and extending longitudinally of the bridge wall. Any other suitable means may be employed for cooling the bridge wall, or artificial cooling means may be entirely dispensed with, depending upon requirements and conditions. The top of this bridge wall will ordinarily project about half way to the surface of the glass bath in the tank, although this is a matter which will also depend upon conditions and requirements. The presence of this wall, extending, as it does, transversely of the tank, tends to cause the hot stream of glass at the center of the tank to spread out and widen, bringing a larger volume of this glass to the surface where it is better exposed to the reflected heat from the arch than would otherwise be the case if the central stream were deeper and narrower. The wall thus tends to retard the flow of the glass through the center of the tank and spread it out, and as a result, the period of time which is required for the glass to move from the filling end to the withdrawing end or slot is very substantially increased, resulting in a better quality of glass and increasing the capacity of the tank as heretofore pointed out.

The retarding of the surface glass and the spreading of it laterally is also preferably augmented by the use of suitable refractory floaters 18, 18, which extend from one side of the tank to the other (Fig. 1), and extend several inches below the surface of the glass. These floaters in combination with the bridge wall very considerably retard the flow of glass and spread it out laterally, the amount of glass flowing along at the center of the tank being reduced, while the amount flowing along at the sides in such center is correspondingly increased.

A second bridge wall is also preferably employed in addition to the one just described, such bridge wall being located intermediate the first wall and the front wall of the tank. This bridge wall, consisting of the arch members 19, 19 and the side walls 20, 20 is somewhat differently constructed than the first wall, as indicated in Fig. 5, a passage 21 being provided through which a flow of air may be directed from the pipe 22 connected to the air line 23. However, any other type of bridge wall at this point might be employed, with or without an artifical cooling means. As in the case of the first bridge wall, refractory floaters 24 are preferably employed above the wall extending from one side of the tank to the other and tending to spread out the center stream of glass and provide a better opportunity for the uniform cooling of the glass and bringing it to a uniform consistency.

Special means are also preferably provided in the working end 9 of the tank for supplying additional heat to the roof and to the side portions of the bath next to the walls 3, 3. Various forms of heating means might be employed, the one illustrated comprising a series of blocks 25, 25, 25 provided at their rear sides with the headers 26, 26, 26. The blocks are provided with a plurality of minute passages 27 having the enlargements 28 at their forward ends, and a mixture of gas and air is supplied to these passages from the headers through the pipe 29. This pipe 29 is supplied from a fan 30 having an air intake at 31 and a gas supply pipe 32, the fan being driven from a motor 33. In this manner, a combustible mixture is forced through the blocks and burns at the inner faces of the refractory blocks. The size of the recesses 28 is such and the gas pressure is such that the combustible mixture in burning permeates the surface of the clay, giving what is known as surface combustion and bringing the faces of the blocks to an incandescent heat. The heat thus supplied from the faces of the blocks together with the reflected heat from the roof heats the glass bath inward from such blocks, the amount of heat supplied at the sides of the bath being much greater than that supplied to the center of the bath, so that the tendency of the heating means is to equalize the temperature of the glass bath at the surface from one side to the other. Under these conditions more glass will be drawn to the outlet slot from the side portions of the tank so that the tendency of the heating means, like the bridge walls, is to widen the flowing stream of surface glass and give a more uniform temperature to the layer of glass withdrawn through the outlet slot. Any tendency toward the formation of devitrified glass in the corners of the tank adjacent the front wall is also reduced because of the increased temperature provided at these points by the incandescent heating blocks. The heating blocks are preferably mounted in the supporting structural work so that they may be removed when desired for replacement and repair.

Fig. 6 illustrates a modified form of heating means for the working end of the tank, which means may be substituted for the heating blocks 25, 25, 25 of the Fig. 1 construction. This heating means is provided in the form of recuperators or regenerators 34, 34 in connection with gas and air ports 35 and 36, through which a supply of gas and air is forced through the passages 37, waste products of combustion being drawn into the recuperators or regenerators from the tank through the passages 38 leading through the checker work of the regenerators. Any other desired heating means might be applied at the side walls in place of those described and illustrated.

Fig. 7 illustrates a modification in the bridge wall construction, involving the filling of the corner spaces on both sides of the bridge wall with the refractory blocks 39 adapted to reduce the volume of stagnant glass at this point and thus prevent the formation of devitrified glass which is apt to occur at this point where there is a very slow movement of the glass combined with a relatively low temperature. In other respects, the bridge wall corresponds to that of Fig. 1. It will be understood that the bridge wall is supported by steel structural members in such manner as to render the structure secure and that only sufficient cooling is applied to the walls to prevent its too rapid wasting away and consequent contamination of the glass incident to the flow of the hot glass over the clay.

What we claim is:

1. In combination in a melting tank, a melting end provided with heating means, a working end having a withdrawing opening, and an arched bridge wall lying below the surface of the glass intermediate the melting end and the working end.

2. In combination in a melting tank, a melting end provided with heating means, a working end having a withdrawing opening, and an arched bridge wall lying below the surface of the glass intermediate the melting end and the working end, such wall having its ends terminating short of the side walls of the tank.

3. In combination in a melting tank, a melting end provided with heating means, a working end having a withdrawing opening, a hollow bridge wall lying below the surface of the glass intermediate the melting and working ends, and a refractory floater in the glass above the bridge wall and extending transversely across the tank.

4. The combination with a glass melting tank having a melting end and a working end with an arch member between said ends partially separating the space above the glass in the melting end from that in the working end, and an arched bridge wall lying below the surface of the glass immediately below said arch member.

5. In combination in a melting tank, a melting end provided with heating means, a working end having a withdrawing opening, and a hollow arched bridge wall lying below the surface of the glass intermediate the melting end and the working end.

6. In combination in a melting tank, a melting end provided with heating means, a working end having a withdrawing opening, an arched bridge wall lying below the surface of the glass intermediate the melting end and the working end, and a second arched bridge wall lying below the surface of the glass intermediate the first bridge wall and the forward end of the tank.

7. In combination in a melting tank, a melting end provided with heating means, a working end having a withdrawing opening, and an arched bridge wall lying below the surface of the glass intermediate the ends of the working end of the tank and extending transversely thereacross.

8. In combination in a melting tank, a melting end provided with heating means, a working end having a withdrawing opening, and a hollow arched bridge wall lying below the surface of the glass intermediate the ends of the working end of the tank and extending transversely thereacross.

9. In combination in a melting tank, a melting end provided with heating means, a working end having a withdrawing opening, an arched bridge wall lying below the surface of the glass intermediate the melting end and the working end, a second arched bridge wall lying below the surface of the glass intermediate the first bridge wall and the forward end of the tank, and a refractory floater in the glass above each bridge wall and extending transversely across the tank.

10. In combination in a melting tank, a melting end provided with heating means, a working end having a withdrawing opening, an arched bridge wall lying below the surface of the glass intermediate the ends of the working end of the tank and extending transversely thereacross, and a refractory floater in the glass above the bridge wall in parallel therewith.

11. In combination in a melting tank, a melting end provided with heating means, a working end having a withdrawing opening, and heating means in the side walls of the working end of the tank adjacent the forward ends of such walls, such heating means comprising refractory blocks having their inner faces recessed, and means for supplying a mixture of gas and air to such faces so as to secure surface combustion over the faces.

In testimony whereof, we have hereunto subscribed our names this 15th day of March, 1926.

K. G. KUTCHKA.
T. H. SWARTZLANDER.